US007661181B1

(12) United States Patent
Whitfield

(10) Patent No.: US 7,661,181 B1
(45) Date of Patent: Feb. 16, 2010

(54) METHOD AND APPARATUS FOR ASSEMBLING FURNITURE COMPONENTS

(75) Inventor: Michael R. Whitfield, Belmont, MS (US)

(73) Assignee: Easy Furniture Assembly, LLC, Belmont, MS (US)

( * ) Notice: Subject to any disclaimer, the term of this patent is extended or adjusted under 35 U.S.C. 154(b) by 562 days.

(21) Appl. No.: 11/375,921

(22) Filed: Mar. 14, 2006

Related U.S. Application Data

(60) Provisional application No. 60/663,495, filed on Mar. 17, 2005.

(51) Int. Cl.

| | |
|---|---|
| ***B21D 39/03*** | (2006.01) |
| ***B25B 27/14*** | (2006.01) |
| ***B23P 19/00*** | (2006.01) |
| ***B23P 21/00*** | (2006.01) |
| ***B68G 7/00*** | (2006.01) |

(52) U.S. Cl. ........................ 29/91.1; 29/281.1; 29/430; 29/564.1; 29/824; 269/56; 414/257

(58) Field of Classification Search ................. 29/56.6, 29/91.1, 91.7, 281.1, 429–431, 564–564.1, 29/784, 791, 799, 822–824, 281.4, 281.6; 269/41, 38, 55, 56; 198/411, 418.7, 168.2; 414/257, 154; 280/79.4, 47.28, 47.29
See application file for complete search history.

(56) References Cited

U.S. PATENT DOCUMENTS

| | | | | |
|---|---|---|---|---|
| 1,963,710 | A | 6/1934 | Mitchell | |
| 3,439,397 | A | 4/1969 | Marshak | |
| 3,727,903 | A | 4/1973 | Brown | |
| 3,914,154 | A | 10/1975 | Pfeiffer | |
| 4,575,059 | A | 3/1986 | Blaine | |
| 4,765,122 | A | 8/1988 | Annas, Sr. et al. | |
| 4,914,873 | A | 4/1990 | Newhouse | |
| 5,054,178 | A | 10/1991 | Zuger | |
| 5,608,956 | A | 3/1997 | Seki | |
| 6,202,296 | B1 * | 3/2001 | Tatsuda et al. | 29/784 |
| 6,226,848 | B1 * | 5/2001 | Kurtz | 29/407.01 |
| 6,763,573 | B2 | 7/2004 | Walt, II et al. | |
| 2004/0098850 | A1 | 5/2004 | Ferronato | |

FOREIGN PATENT DOCUMENTS

| | | |
|---|---|---|
| DE | 019813373 | 10/1999 |
| EP | 001046481 | 10/2000 |

* cited by examiner

*Primary Examiner*—David P Bryant
*Assistant Examiner*—Alexander P Taousakis
(74) *Attorney, Agent, or Firm*—Garvey, Smith, Nehrbass & North, L.L.C.; Charles C. Garvey, Jr.

(57) ABSTRACT

A method and apparatus for fabricating upholstered furniture articles and components is disclosed. The method employs an assembly line with work stations. A selected beginning part such as a wooden frame or skeleton is transported along the assembly line using a specially configured fixture or jig to hold the frame or skeleton. At selected work stations, the fixture can be rotated or tilted depending upon the work to be performed. A locking arrangement secures the fixture to the track at each work station.

16 Claims, 5 Drawing Sheets

METHOD AND APPARATUS FOR ASSEMBLING FURNITURE COMPONENTS

CROSS-REFERENCE TO RELATED APPLICATIONS

Priority of U.S. Provisional Patent Application Ser. No. 60/663,495, filed Mar. 17, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for assembling furniture components. More particularly, the present invention relates to a method and apparatus for assembling components that features a railway having a plurality of workstations spaced along the railway, a locking device that secures a traveling fixture or jig to a selected work station, wherein the jig or fixture securely holds a wooden frame or skeleton that is the beginning part of an upholstered article (or component) of furniture. At each workstation, a different operation can be performed or a different item added to the skeleton or frame, the added items including for example, foam padding, molded foam material, fabric, paper tacking strips, or cardboard.

2. General Background of the Invention

Furniture manufacturers frequently begin the construction of an upholstered furniture article with a wooden frame or skeleton. Additional materials are attached to this skeleton or frame using staplers, nails or like fasteners. These additional materials can include foam padding, fabric upholstery, paper tacking strips and the like. During the manufacture of upholstered furniture, the piece has typically been moved manually from one worker to the next in the prior art. Each worker in sequence performs different operations on the frame or skeleton until the upholstered furniture article is complete and ready for shipment to a furniture distributor, wholesaler, retailer, or the like.

Patents have issued that are directed generally to assembly line construction of various articles including furniture articles. The following table lists examples of such patents.

The following U.S. Publication and Patents are incorporated herein by reference:

TABLE

| U.S. Pat. No. | TITLE | ISSUE DATE |
|---|---|---|
| 1,963,710 | Upholstery Making Apparatus | Jun. 19, 1934 |
| 3,439,397 | System of Making Fibrous-Filled Furniture Seat and Back Cushion Elements | Apr. 22, 1969 |
| 3,727,903 | Furniture Truck Frame | Apr. 17, 1973 |
| 3,914,154 | Method and Device for the Production of Layered Pressed Panels | Oct. 21, 1975 |
| 4,575,059 | Method and Jig for Furniture Construction | Mar. 11, 1986 |
| 4,765,122 | Conveyor | Aug. 23, 1988 |
| 4,914,873 | Work Environment System | Apr. 10, 1990 |
| 5,054,178 | Process and Apparatus for the Production of Innersprings for Mattresses and Upholstered Furniture | Oct. 8, 1991 |
| 5,608,956 | System for Automatically Assembling a Seat | Mar. 11, 1997 |
| 6,763,573 | Assembly System for Monitoring Proper Fastening of an Article of Assembly at More than One Location | Jul. 20, 2004 |
| 2004/0098850 | Apparatus for Upholstering Components of Chairs, Armchairs or the like | May 27, 2004 |
| DE019813373 | Assembly jig for Furniture Carcasses | Oct. 7, 1999 |
| EP001046481 | Furniture Assembly Line | Oct. 25, 2000 |

BRIEF SUMMARY OF THE INVENTION

The present invention is designed for the manufacturing of component upholstery furniture. The present invention provides a method and apparatus for manufacturing upholstered furniture or a component of an upholstered furniture article. The apparatus features a specially configured assembly line that eliminates unnecessary handling and specialized skilled labor.

The method and apparatus of the present invention reduces fatigue, increases production capacity, and economizes space on production floor.

Using the method and apparatus of the present invention, a manufacturer of upholstered furniture or a component of upholstered furniture feeds a continuous flow of parts from start to finish without the need of an individual on line having to load and unload the item in between the beginning and the end of the assembly line.

In the manufacture of a component of upholstered furniture, a beginning furniture part (i.e. a wooden skeleton or frame) is initially placed on a fixture or a jig, held with a clamping device. The fixture or a jig rolls on bearings which travel in a track. The jig or fixture can be rotated (e.g. 180°) and can be tilted or inclined such as, for example, a measure of about 45°.

Spaced along the line are multiple work stations. At each work station there is provided an air cylinder which extends a specially shaped holder, preferably fork shaped to hold the jig or fixture in place. At the work station, the jig or fixture can be rotated or tilted to accommodate a particular operation that is being performed at that work station.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
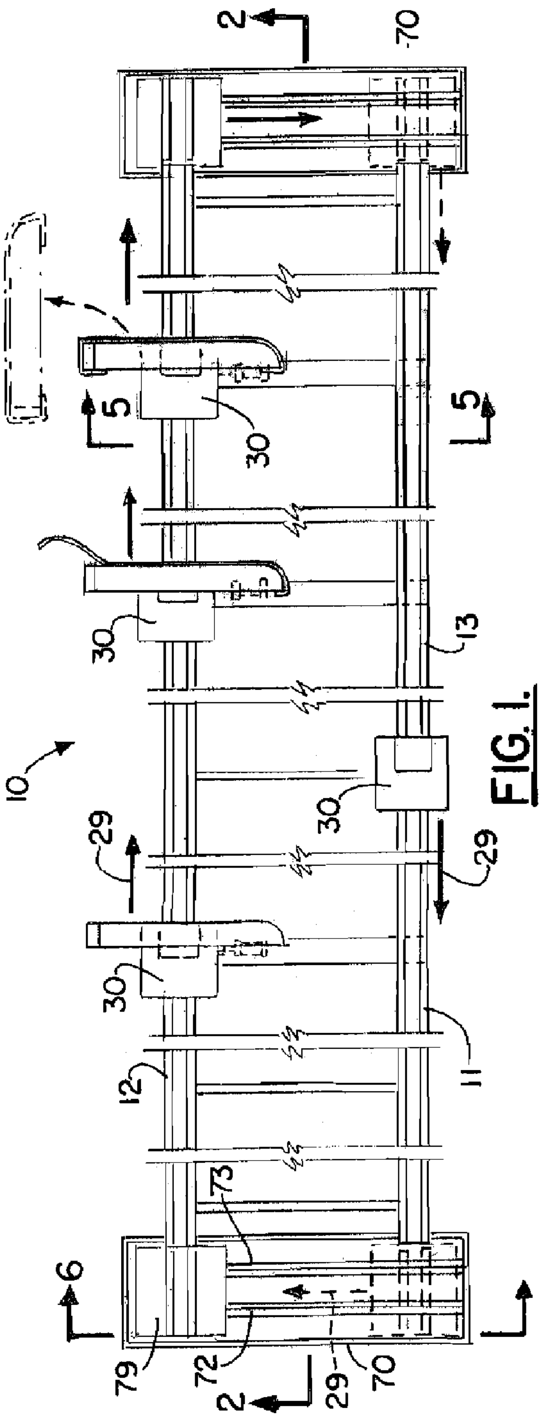
FIG. 1 is a plan view of the preferred embodiment of the apparatus of the present invention.
Figure 2:
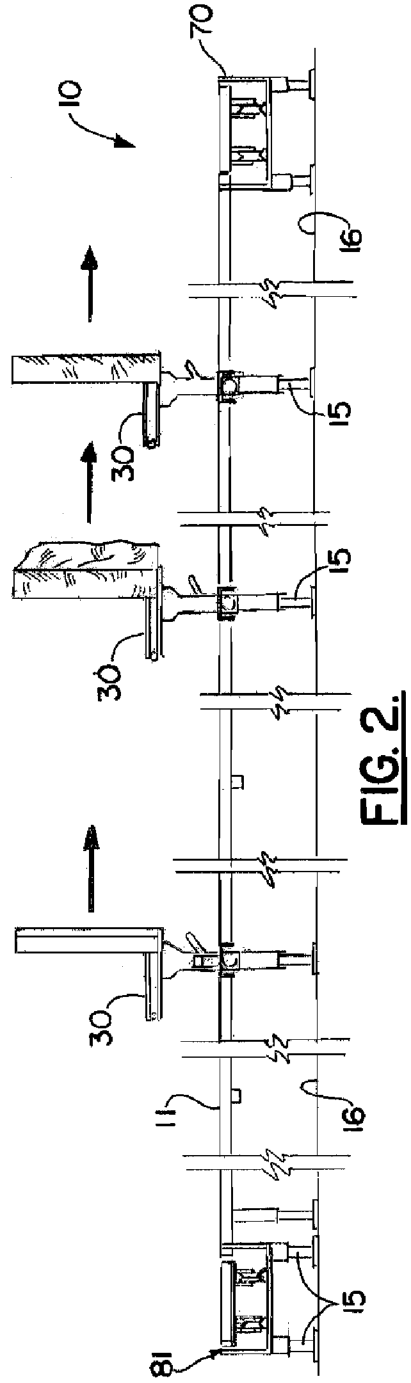
FIG. 2 is sectional view of the preferred embodiment of the apparatus of the present invention taken along lines 2-2 of FIG. 1.

In FIGS. 1-7, furniture assembly apparatus 10 includes a railway 11 upon which travels one or more fixtures or jigs 30. The railway 11 includes one or more elongated tracks or channels and can include for example, a line channel 12 and return channel 13 the two being spaced apart and connected with a transfer box 70 at one or at both ends of railway 11. In this fashion, a fixture or jig 30 can travel from a point of beginning on the line channel 12 and then from one work station to the next until it reaches the end of the line channel 12 at transfer box 70. The fixture 30 can travel from the line channel 12 to the return channel 13 via the transfer box 70. The completed furniture article can be removed/unloaded from the jig 30 at the transfer box 70. The empty jig 30 then returns via the return channel 13 to a position near the point of beginning where the fixture 30 is removed from return channel 13 and placed upon line channel 12 at the point of beginning—loaded with a new frame, skeleton component or the like.

The railway 11 can be supported with a plurality of legs 15. Legs 15 can be telescoping legs so that the elevation of the railway 11 can be adjusted. The legs 15 form an interface with floor 16 that supports the line channel 12, return channel 13 and transfer box 70. Line channel 12 is shown in more detail in FIG. 2.

Each channel 12, 13 provides a channel member 17 having a pair of spaced apart, generally parallel flanges 18, 19 that are connected with web 20. The flanges 18, 19 extend upwardly in relation to the web 20. The web 20 provides a structure upon which the wheels 32 of jig or fixture 30 can travel as the fixture 30 moves along the line channel 12.

Each work station is defined by a transverse or a cross support brace 14 as will be discussed more fully hereinafter. A locking device 57 is mounted upon each cross support brace 14 that will function as a workstation. In order to maintain the wheels 32 of each fixture 30 within channel member 17, a pair of inwardly directed flanges 21, 22 are provided respectively upon the flanges 18, 19 as shown. Return channel 13 likewise provides a channel member 23 comprised of web 26, flanges 24, 25 and flanges 27, 28.

In the drawings, arrows 29 schematically illustrate the travel path of each fixture or jig 30 as it travels from line channel 12, to transfer box 70 to return channel 13 and then along channel 13 until a point of unloading.

Figure 3:
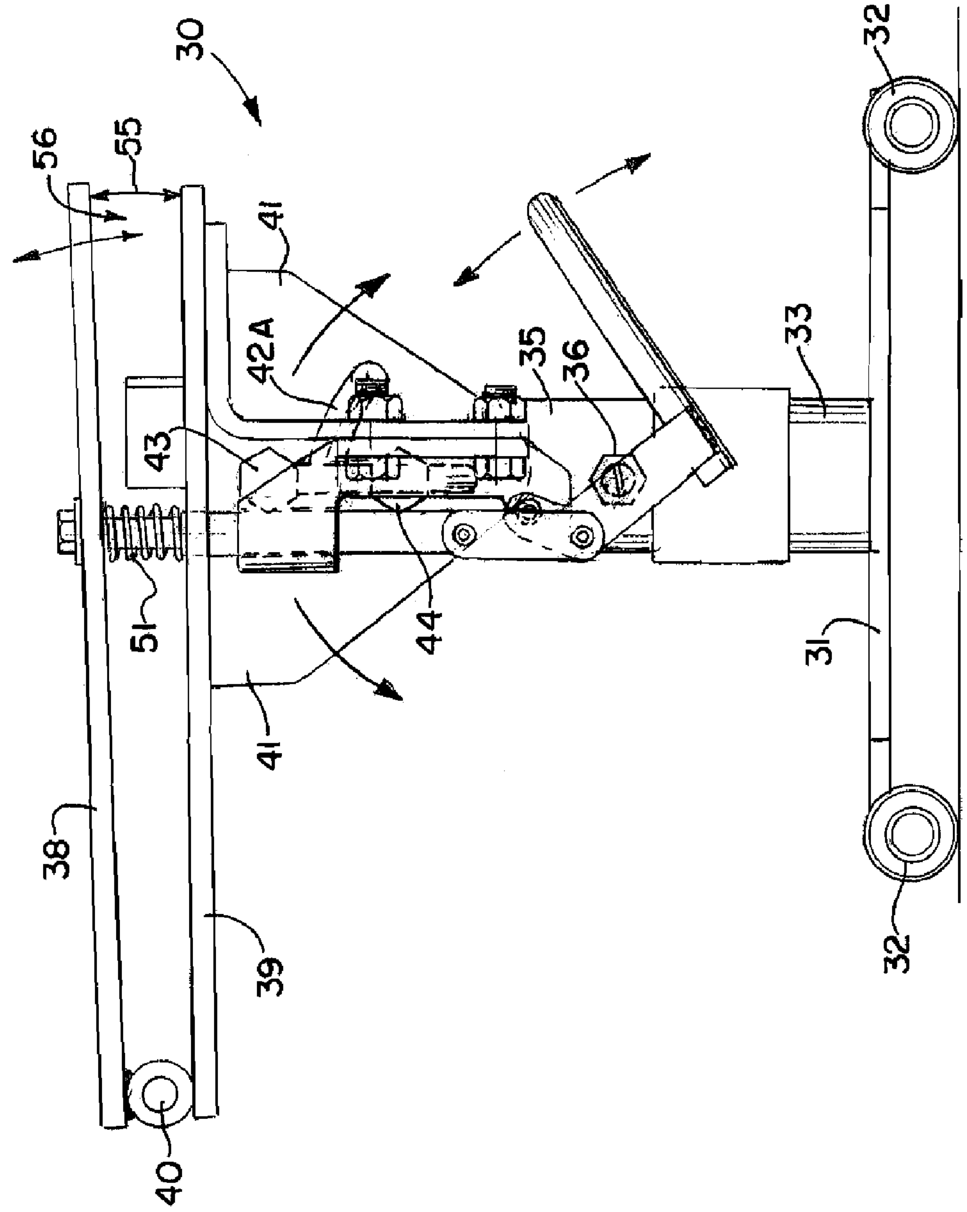
FIG. 3 is a partial side view of the preferred embodiment of the apparatus of the present invention.
Figure 4:
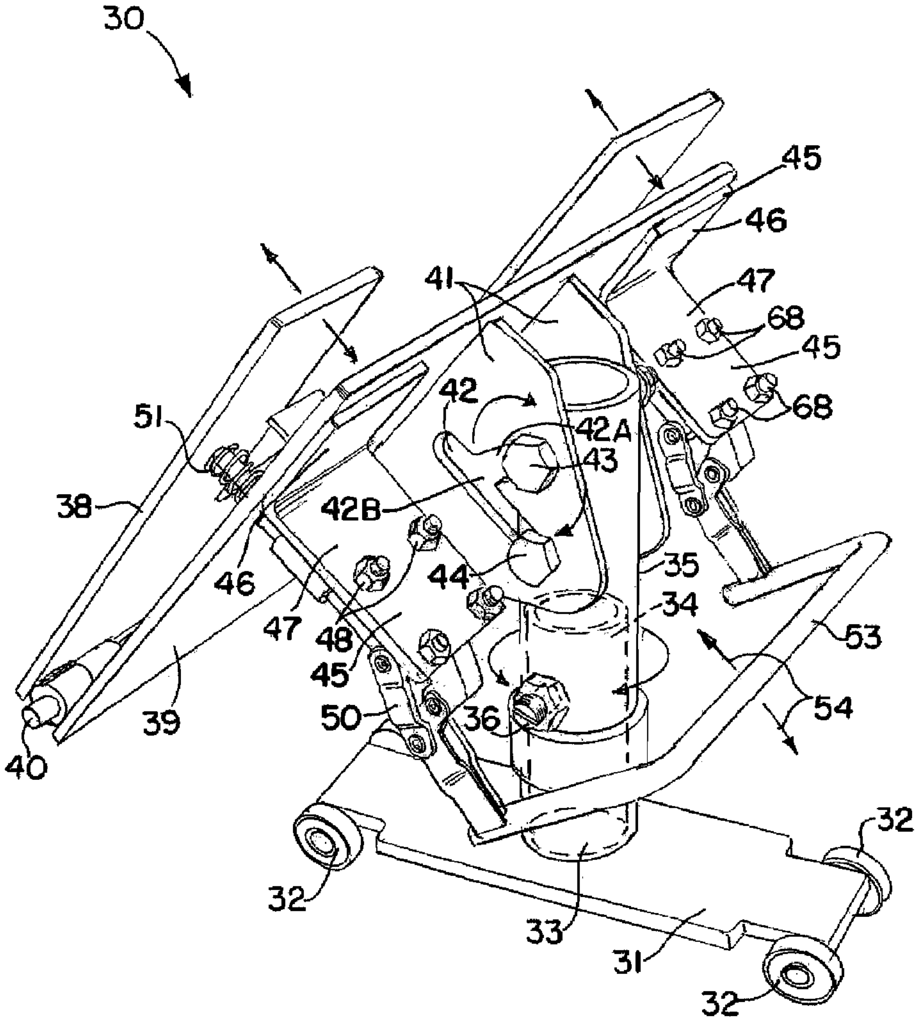
FIG. 4 is a perspective view of an preferred embodiment of the apparatus of the present invention showing the fixture.

In FIGS. 3 and 4, fixture or jig 30 is shown in more detail. Fixture 30 includes a base 31 that can be in the form or a square or generally rectangular plate as shown. A plurality of preferably four wheels 32 are attached to base 31. Pedestal 33 is a vertically extending pedestal that extends upwardly from base 31. The pedestal 33 preferably includes an internal sleeve 34 and an external sleeve 35. The separate sleeves 34, 35 enable a rotating connection to be made between the sleeves 34, 35 so that the fixture top and bottom plates 38, 39 can be rotated as a unit with respect to the base 31. A connection 36 such as a bolted connection joins the internal and external sleeves 34, 35. Multiple openings can be provided in each of the sleeves 34, 35 at selected circumferentially spaced apart positions so that the internal and external sleeves 34, 35 can be rotated to selected angular positions relative to one another, such as 90 degrees, 120 degrees, 180 degrees apart, etc.

The fixture top plate 38 and fixture bottom plate 39 are attached along respective edge portions with hinge 40 as shown in the drawings. Fixture bottom plate 39 is supported upon cam lock bracket 41. Bracket 41 can be in the form of one or more plates that are welded to the underside of fixture bottom plate 39. The cam lock bracket 41 has a shaped slot 42 that enables the fixture bottom plate 39 to be either horizontally positioned or inclined. Slot 42 has laterally extending section 42A and generally vertically extending section 42B. A pair of bolted connections 43, 44 are provided, bolted connected 43 being an upper connection that can occupy laterally extending 42A section of slot 42. Bolted connection 44 always occupies a position in the generally vertically extended section 42B of slot 42. Bolted connection 43 occupies lateral section 42A when a tilted orientation is desired (FIG. 4).

Flanged connectors 45 are affixed to the underside of fixture bottom plate 39. Each of the flanged connectors 45 can include flanges 46 and 47 that are integrally joined or welded and which form an angle of about 90 degrees. Openings 48 in flange 47 are receptive of fasteners for attaching clamps 50 to flanged connectors 45. In a preferred embodiment, there are two flanged connectors 45, each equipped with a clamp 50. The clamps 50 can be commercially available clamps such as those that are manufactured and sole by Destaco, for example model 608, part number 56080-608. Bolted connection 68 extends through openings in both fixture top plate 38 and fixture bottom plate 39. The bolt 68 provides a threaded end portion that is joined at connection 52 to clamp 50. A pair of clamps 50 can be used, the clamps 50 connected by a handle 53 that moves the clamps 50 between clamping and releasing positions.

Arrows 54 indicate schematically the upward and downward movement of handle 53 that effects a clamping or unclamping of the fixture top 38 and bottom 39 plates. In the clamping position, the plates 38, 39 pivot upon hinge 40, coming together and compressing spring 51. The clamps 50 are not sufficiently strong to overcome spring 51. They also pull the plates 38, 39 together with sufficient force to clamp a wooden frame 85 or a skeleton that is to be the beginning of a piece of upholstered furniture. Arrow 55 in FIG. 4 shows the spacing between top plate 38 and bottom plate 39 in an open position. The space 56 in between plates 38, 39 is greater when the clamps 50 are open and smaller when the clamps 50 are closed.

Figure 5:
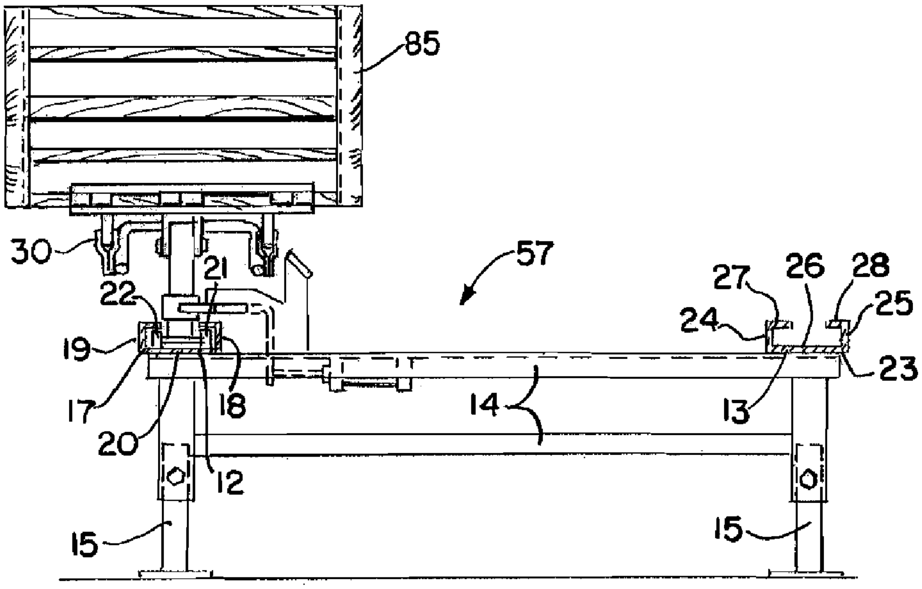
FIG. 5 is a partial sectional view of the preferred embodiment of the apparatus of the present invention taken along lines 5-5 of FIG. 1.
Figure 7:
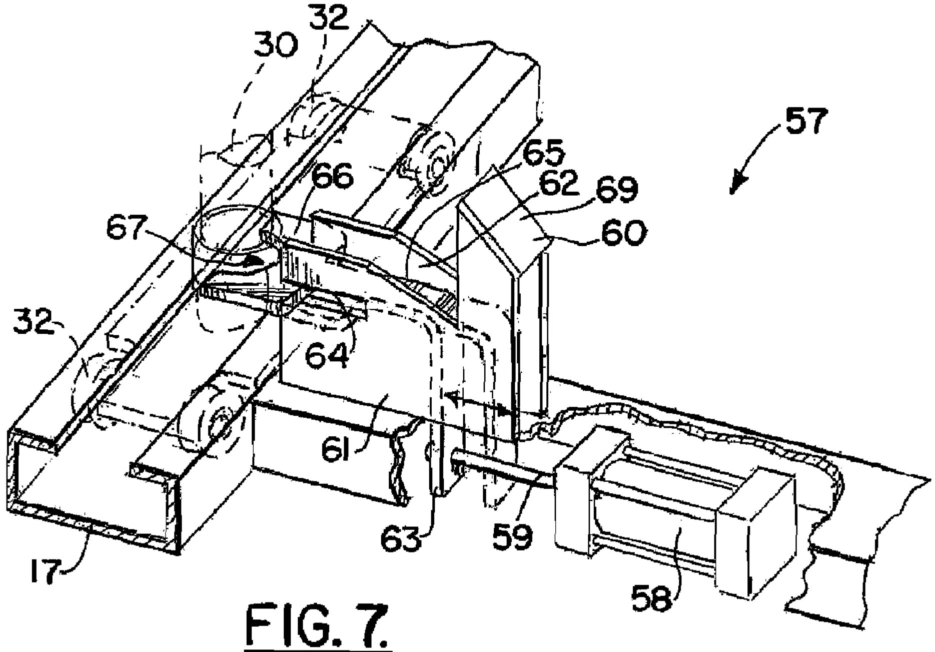
FIG. 7 is a partial perspective view of the preferred embodiment of the apparatus of the present invention.
Figure 8:
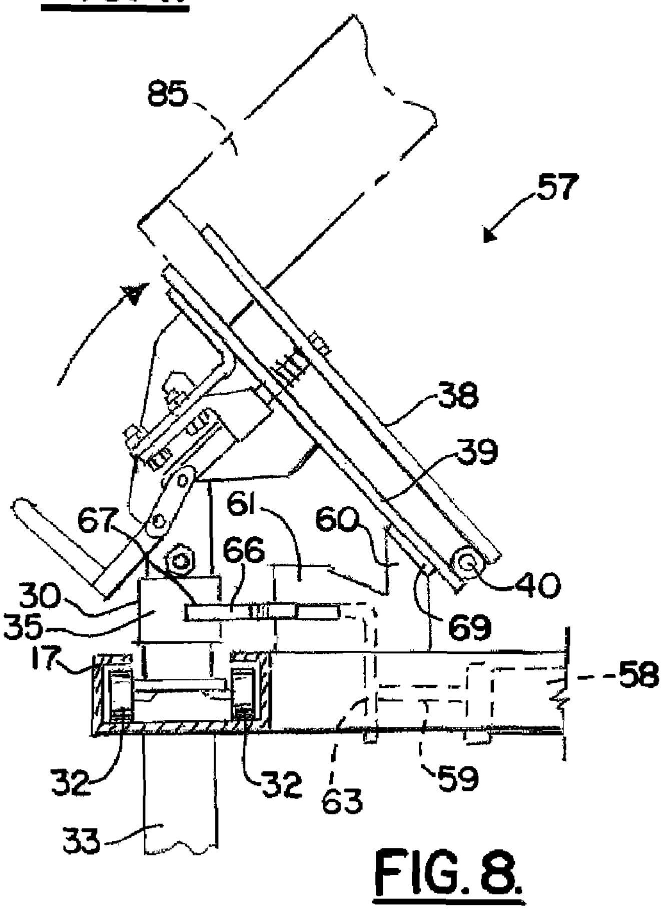
FIG. 8 is a partial sectional elevation view of the preferred embodiment of the apparatus of the present invention.

When the fixture or jig 30 reaches a work station that can include a selected cross support brace 14, that cross support brace 14 is equipped with a locking device 57 (FIGS. 5 and 7). The fixture or jig 30 can be rigidly secured so that any desired operation can be performed on the frame 85 at a work station. The locking device 57 employs a cylinder 58 such as a pneumatic cylinder having a push rod 59 that moves between extended and retracted positions. Workstation bracket 60 attaches to pushrod 59. The workstation bracket 60 is comprised of a pair of spaced apart plates 61, 62 having respective slots 64, 65. The workstation bracket 60 employs an ell shaped arm 63 having a shaped plate 66 attached to it. The shaped plate 66 provides a semicircular recess 67 that conforms to the outer surface of lower, external sleeve 35 of pedestal 33. Shaped place 66 engages sleeve 35 at a position near its joint to base 31. Inclined plate 69 provides support for fixture bottom plate 39 and thus the upper portion of jig 30 when the jig 30 is inclined in the orientation of FIG. 8.

Figure 6:
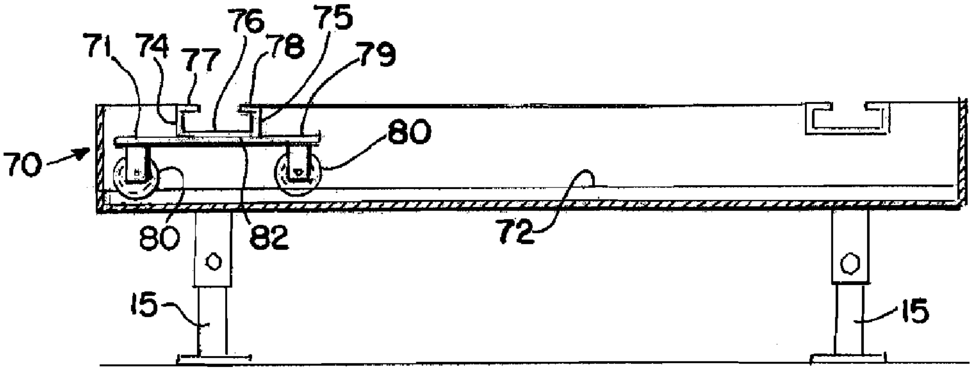
FIG. 6 is a sectional view taken along lines 6-6 of FIG. 1.

The transfer box 70 is shown in detail in FIGS. 1 and 6. The transfer box 70 includes a pair of spaced apart tracks 72, 73 that are receptive of correspondingly shaped wheels 80 of carriage 71. Carriage 71 provides a generally rectangular plate 79 to which the wheels 80 are attached at the underside of the plate 79. A flanged beam 82 is attached to the upper surface of plate 79. The flanged beam 82 includes spaced apart vertical flanges 74, 75 connected with web 76. Inwardly extending flanges 77, 78 help retain fixture 30 during transfer upon rails 72, 73. A stop 81 prevents the fixture 30 from traveling from line channel 12 to carriage 71 and then beyond carriage 71. The apparatus 10 of the present invention can be manufactured of steel, aluminum or other structurally sound material.

The following is a list of parts and materials suitable for use in the present invention.

PARTS LIST

Part Number Description
10 furniture assembly apparatus
11 railway
12 line channel
13 return channel
14 cross support brace
15 telescopic let
16 floor
17 channel member
18 flange
19 flange
20 web
21 angle member
22 angle member
23 channel member
24 flange
25 flange
26 web
27 flange
28 flange
29 arrow
30 fixture
31 base
32 wheel
33 pedestal
34 internal sleeve
35 external sleeve
36 connection
38 fixture top plate
39 fixture bottom plate
40 hinge
41 cam lock bracket
42 slot
42A lateral section
42B vertical section
43 bolted connection
44 bolted connection
45 flanged connector
46 flange
47 flange
48 opening
49 arrow
50 clamp
51 return spring
52 connection
53 handle
54 arrow
55 arrow
56 space
57 locking device
58 cylinder
59 pushrod
60 work station bracket
61 plate
62 plate
63 ell shaped arm
64 slot
65 slot
66 shaped plate
67 semicircular recess
68 bolt
69 inclined plate
70 transfer box
71 carriage
72 track
73 track
74 flange
75 flange
76 web
77 flange
78 flange
79 plate
80 wheel
81 stop
82 flanged beam
85 wooden frame All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of constructing upholstered furniture components, comprising the steps of:

a) providing a frame having a railway that defines an assembly line with multiple work stations;

b) mounting a plurality of jigs on the railway, each jig having a clamp for holding a frame part of an upholstered furniture component;

c) holding the jig in place at each work station with a gripping device;

d) performing a plurality of different jobs on the component at respective work stations;

e) wherein each jig travels upon the railway when moving from one work station to another work station; and f) wherein the jig can be tilted to an inclined position and further comprising tilting the component by tilting the jig.

2. A method of constructing upholstered furniture components, comprising the steps of:

a) providing a frame having a railway that defines an assembly line with multiple work stations;

b) mounting a plurality of jigs on the railway, each jig having a clamp for holding a frame part of an upholstered furniture component;

c) holding the jig in place at each work station with a gripping device;

d) performing a plurality of different jobs on the component at respective work stations;

e) wherein each jig travels upon the railway when moving from one work station to another work station; and f) wherein the jig can be rotated and further comprising rotating the component by rotating the jig.

3. A method of constructing upholstered furniture components, comprising the steps of:

a) providing a frame having a railway that defines an assembly line having multiple spaced apart work stations;

b) mounting a plurality of jigs on the railway, each jig having a base that engages the railway and an upper having a holder configured to hold part of an upholstered furniture component;

c) moving the jig along the railway from one work station to another work station;

d) securing the jig in place at each work station; and e) performing a plurality of different jobs on the component at respective work stations; and f) moving the jig with respect to it's base in steps "b" through "d" said movement including rotating the component relative to the base.

4. The method of claim 3 wherein there are a pair of railways and further comprising a transfer box for enabling transfer of a jig from one railway to the other railway and the additional step of transferring a jig from one railway to the other railway via the transfer box.

5. The method of claim 3 further comprising interlocking the jig to the railway with the gripping device wherein the gripping device moves between released and engaged positions.

6. The method of claim 5 wherein the gripping device includes a movable powered pushrod having a gripping tool mounted to it, the pushrod sliding between engaged and released positions and further comprising moving the pushrod to an extended position to engage the gripping tool and the jig.

7. The method of claim 3 wherein the jig can be tilted to an inclined position and further comprising tilting the component by tilting the jig.

8. The method of claim 3 wherein the jig can be rotated and further comprising rotating the component by rotating the jig.

9. The method of claim 3 wherein each jig is wheeled and further comprising rolling each jig on the railway in step "e".

10. A method of constructing upholstered furniture components, comprising the steps of:

a) providing a frame having a railway that defines an assembly line having multiple spaced apart work stations;

b) mounting a plurality of jigs on the railway, each jig having a base that engages the railway and an upper having a holder configured to hold part of an upholstered furniture component;

c) moving the jig along the railway from one work station to another work station;

c) securing the jig in place at each work station; and d) performing a plurality of different jobs on the component at respective work stations; and e) moving the jig with respect to it's base in steps "b" through "d" said movement including tilting the component relative to the base.

11. The method of claim 10 wherein there are a pair of railways and further comprising a transfer box for enabling transfer of a jig from one railway to the other railway and the additional step of transferring a jig from one railway to the other railway via the transfer box.

12. The method of claim 10 further comprising interlocking the jig to the railway with the gripping device wherein the gripping device moves between released and engaged positions.

13. The method of claim 12 wherein each jig is wheeled and further comprising rolling each jig on the railway in step "e".

14. The method of claim 12 wherein the gripping device includes a movable powered pushrod having a gripping tool mounted to it, the pushrod sliding between engaged and released positions and further comprising moving the pushrod to an extended position to engage the gripping tool and the jig.

15. The method of claim 10 wherein the jig can be tilted to an inclined position and further comprising tilting the component by tilting the jig.

16. The method of claim 10 wherein the jig can be rotated and further comprising rotating the component by rotating the jig.

* * * * *